April 18, 1961 P. F. CROSBY 2,980,222
ESCAPEMENT MECHANISM FOR GRAVITY CONVEYOR
Filed May 11, 1959 3 Sheets-Sheet 1
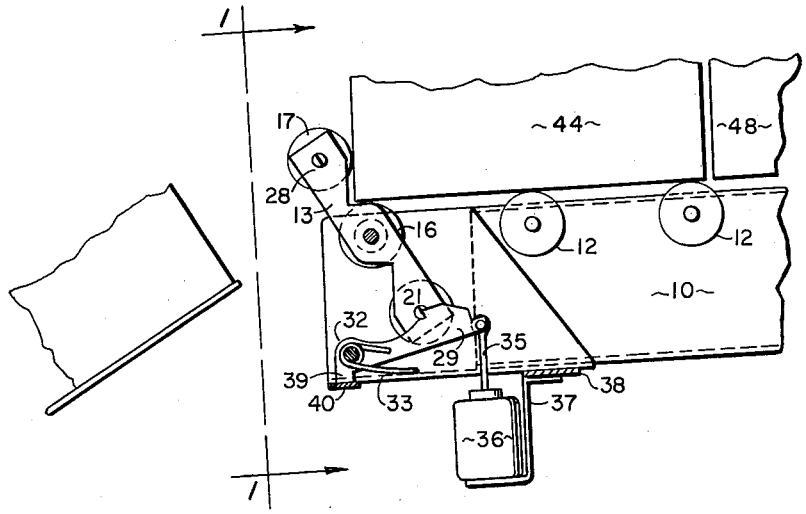
FIG_2_
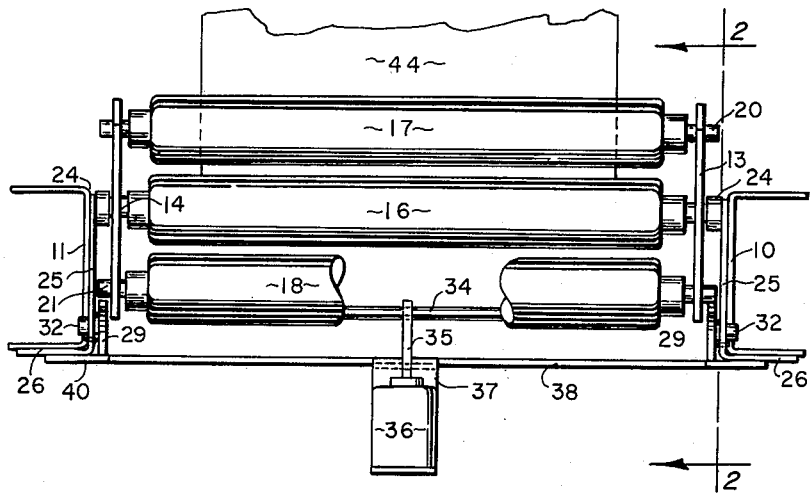
FIG_1_
INVENTOR.
Peter F. Crosby
BY
D. Emmett Thompson
ATTORNEY April 18, 1961 P. F. CROSBY 2,980,222
ESCAPEMENT MECHANISM FOR GRAVITY CONVEYOR
Filed May 11, 1959 3 Sheets-Sheet 2
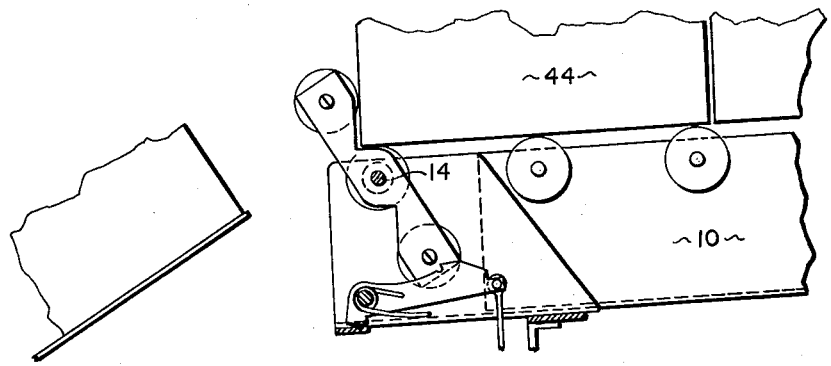
FIG_3_
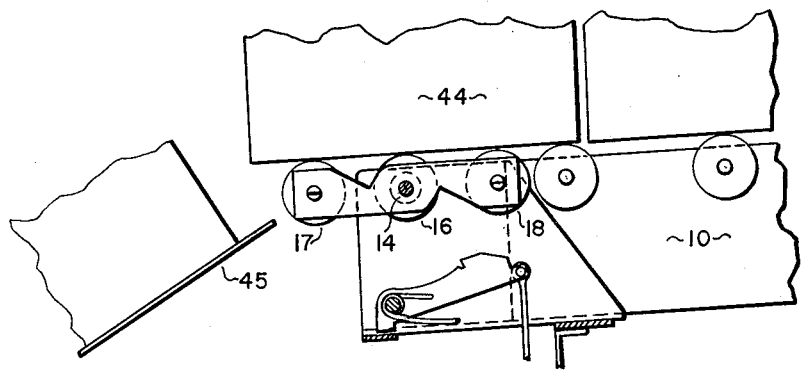
FIG_4_
INVENTOR.
Peter F. Crosby
BY
D. Emmett Thompson
ATTORNEY

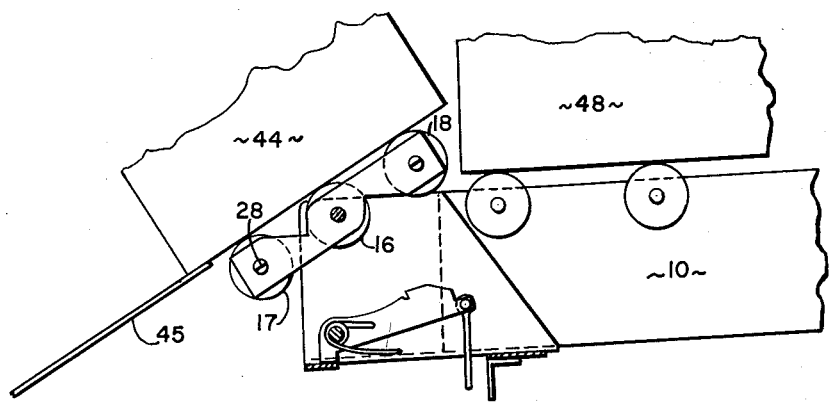
FIG_5_
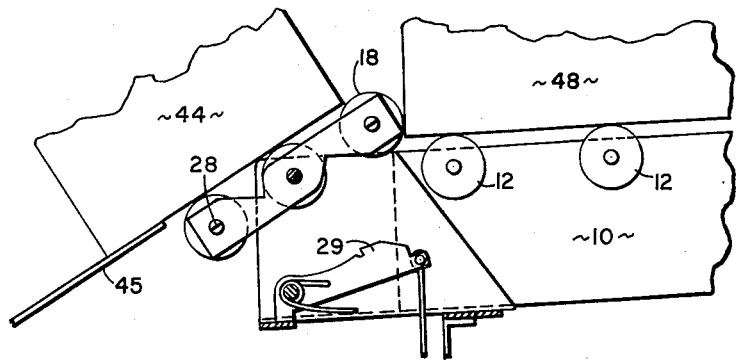
FIG_6_

U̇nited States Patent Office 2,980,222
Patented Apr. 18, 1961

2,980,222

ESCAPEMENT MECHANISM FOR GRAVITY CONVEYOR

Peter F. Crosby, Cazenovia, N.Y., assignor to Lamson Corporation, Syracuse, N.Y., a corporation of New York Filed May 11, 1959, Ser. No. 812,446

5 Claims. (Cl. 193—35)

This invention relates to gravity type conveyors and more particularly has to do with a package escapement mechanism operable to effect delivery of packages successively from the conveyor. Conveyors of the gravity type are mounted upon an incline and are provided with anti-friction members for supporting the packages in a row on the conveyor, whereby the packages gravitate downwardly on the conveyor for discharge at the lower end thereof.

This invention has as an object a package escapement mechanism embodying a particularly simple structure, economical to build, and which is adapted for use with all types of gravity conveyors, and which functions to deliver the packages successively from the conveyor to a platform, chute, or other package receiving support, the escapement mechanism effectively handling packages of all types and forming a temporary bridging extension between the lower end of the conveyor and the package receiving support.

The invention consists in the novel features and in the combinations and constructions hereinafter set forth and claimed.

In describing this invention, reference is had to the accompanying drawings in which like characters designate corresponding parts in all the views.

In the drawings—

Figure 1 is an end elevational view of the escapement mechanism embodying my invention.

Figure 2 is a view taken on line 2—2, Figure 1, and in which the escapement is shown in latched position.

Figure 3 is a view similar to Figure 2, showing the platform latch moved out of latching position.

Figure 4 is a view similar to Figures 2 and 3, illustrating the leading package on the conveyor advancing over the escapement mechanism which is assuming bridging position.

Figure 5 is an illustration of the mechanism with the platform revolved to bridging position, with the leading package advanced to the delivery chute.

Figure 6 is a view, similar to Figure 5, illustrating further advancement on the delivery chute and the platform positioned for engagement by the next following package on the conveyor.

The conveyor illustrated in the drawings consists of a pair of channel shaped side members 10, 11, which carry a plurality of anti-friction package supporting members, here shown in the form of rollers 12 journalled on axes extending transversely of the side members 10, 11.

The escapement mechanism includes a platform mounted at the lower end of the conveyor for rotation about an axis extending transversely thereof. This platform consists of side plates 13 mounted medial of their ends on a shaft 14. The platform is likewise provided with anti-friction package supporting members, here shown in the form of rollers 16, 17 and 18.

The roller 16 is journalled on the shaft 14. The roller 17 is journalled between like ends of the plates 13 on a shaft 20, and the roller 18 is journalled between the opposite ends of the plates 13 on a shaft 21. The shafts 14, 20 and 21 are preferably fixedly secured to the side plates 13.

The shaft 14 may be journalled between the lower ends of the conveyor side members 10, but it is here shown as journalled in bearings 24 carried by plates 25 bent outwardly at their lower edges to provide flanges 26 overlying the bottom flanges of the conveyor side members 10, 11, see Figure 1. The plates 25 are fixedly secured to the conveyor side members 10, 11, by bolts, welding, or the like.

The ends of the shafts 20, 21 extend outwardly a slight distance beyond the plates 13 and these projecting end portions are flattened, as at 28 for engagement by latch members 29. The axes of the shafts 14, 20 and 21 are co-planar in the side members 13, and the shaft 14 is positioned so that the periphery of the center roll 16 is positioned in the plane of the top surfaces of the conveyor rolls 12. The latch members 29 are mounted at their forward ends on pins 32 carried by the plates 25. The latches are urged upwardly, or in a counterclockwise direction, Figures 2 to 6, by torsion springs 33. The latches 29 are connected at their opposite ends to the ends of a rod 34, which is connected to the upper end of a link 35 actuated downwardly by a solenoid 36. The solenoid 36 is mounted upon a bracket 37 having transversely extending portions 38 connected to the flanges 26 of plates 25, see Figures 1 and 2. The latches 29 are formed with tail portions 39 for engagement with plates 40 affixed to the flanges 26 of plates 25, the tail pieces providing a stop for limiting upward movement of the latch by the spring 33.

Figure 2 illustrates the escapement platform in latched position, the latches engaging the flattened end portions of shaft 21. In this position, the end portion of the platform carrying roller 17 extends upwardly beyond the conveyor for engagement by the lowermost package 44 on the conveyor and thus forming a stop for the package. The leading bottom edge of the package is then positioned upon the center roller 16. When the solenoid is actuated, the latch is moved downwardly out of latching position, as shown in Figure 3 of the drawings. This permits advancement of the package 44 on the gravity conveyor and this advancement causes the platform to rotate about the axis of the shaft 14. This rotation is continued by the advancement of the package, whereby the platform assumes the position shown in Figure 4 in which the package 44 is supported by all three of the rollers 16, 17 and 18. In this position, the platform serves as a temporary extension of the conveyor bridging the space between the lower end of the conveyor and a package receiving member which may be another carrying section, as a chute or shelf 45.

As the package advances, the center of gravity of the package advances forwardly of the medial roller 16, whereby the package and the platform tip downwardly. The length of the escapement platform is comparable to the spacing between the shelf 45 and the lower end of the conveyor. It will be observed that in Figure 4, the forward edge of the package has advanced slightly over the upper edge of the shelf 45. Accordingly, when the platform is tilted, as in Figure 5, the leading edge of the package is well on the shelf 45, permitting the package to slide downwardly over the rollers 16, 17 and 18, onto the shelf 45.

It will be observed that in Figure 5, the roller 18 at the opposite end of the platform has now moved to a position above the conveyor for engagement by the next package 48 as it gravitates forwardly. In Figure 6, the package 48 has engaged the roller 18 and the advancement of this package will continue the rotation of the platform, assuring delivery of the package 44 to the shelf 45, and this rotation will continue until the ends of the shaft 20 are engaged by the latches 29, whereby the platform will be held stationary to form a stop against further advancement of the package 48 until the solenoid 36 is again actuated.

It will be apparent that my escapement mechanism is operative with packages that may vary substantially in dimension, and that the packages are delivered from the conveyor to the delivery chute while being effectively supported during such delivery.

The escapement mechanism of my invention has the advantage of functioning to deliver packages continuously upon one sustained actuation of the latch solenoid.

What I claim is:

1. An escapement mechanism for a gravity conveyor comprising a package supporting platform at the lower end of the conveyor and being journalled medial of its ends for rotation about an axis extending transversely of the conveyor, a latch operable in latching position to hold said platform stationary and extending in angular position to the conveyor with one end portion of the platform extending upwardly beyond said conveyor and forming a stop for the lowermost package on said conveyor, means operable to move said latch out of latching position to permit rotation of said platform about its axis by movement of said lowermost package for the release of said lowermost package, said platform, upon such rotation, forming a temporary extension of said conveyor.

2. A gravity conveyor, a delivery chute positioned forwardly and below the lower end of said conveyor, an escapement mechanism between said conveyor and delivery chute, said mechanism comprising a platform journalled medial of its ends on an axis extending transversely of said conveyor, the length of said platform being comparable to the spacing between the lower end of said conveyor and said chute, whereby said platform provides a bridging extension of said conveyor for the transfer of a package from the conveyor to said chute, a latch operable in latching position to hold said platform stationary and extending in angular relation to the plane of said conveyor with one end portion of the platform extending upwardly from the conveyor for engagement by the lowermost package on the conveyor and forming a stop therefor, means operable to move said latch out of latching position to permit rotation of said platform about said axis to bridging position by the advancement of said lowermost package, the end portion of said platform opposite to said one end portion assuming a position above said conveyor to provide a stop for the next package thereon when said platform is in bridging position.

3. A gravity conveyor, a discharge chute arranged forwardly and below the lower end of said conveyor, a bridging platform journalled medial of its ends for rotation between the conveyor and chute about an axis extending transversely of the conveyor, a latch movable into and out of latching engagement with said platform, said latch being operable upon latching engagement with the platform to hold the same against rotation in angular relation to the plane of said conveyor and with one end portion of the platform extending above said conveyor for engagement by the lowermost package on the conveyor to stop advancement of the package and the opposite end portion of said platform extending downwardly from the conveyor, said platform being rotatable about said axis upon disengagement of said latch to release said lowermost package for advancement along said platform to said chute.

4. An escapement mechanism for successively releasing packages at the lower end of a gravity conveyor and transferring the released packages to a package receiving member positioned forwardly of and below the lower end of the conveyor, said mechanism comprising a platform when positioned in registration with said conveyor and receiving member substantially bridging the space therebetween, said platform being journaled medial of its ends for rotation between the conveyor and receiving member about an axis extending transversely of the conveyor, a latch means for holding said platform stationary and in angular relation to the plane of said conveyor and with an end portion of the platform extending above said conveyor for engagement by the lowermost package on the conveyor to stop the advancement of said package, said platform being movable about said axis upon disengagement of said latch from said angular position to said registration position for the advancement of the released package over said platform to said receiving member, the opposite end portion of said platform being positioned above said conveyor for engagement by the next succeeding package when said platform is in said bridging position.

5. A gravity conveyor, a discharge chute arranged forwardly and below the lower end of said conveyor, an escapement mechanism located between the lower end of the conveyor and said chute and operable for successively releasing packages at the lower end of the conveyor and transferring the packages to said chute, said escapement mechanism comprising a platform journaled medial of its ends for rotation about an axis extending transversely of the conveyor, a roller journalled on said axis in alignment with said conveyor and extending transversely thereof, a second roller journaled at one end of said platform and a third roller journaled at the opposite end of said platform, said second and third rollers being arranged in said platform substantially coplanar with said first roller, said platform being rotatable about said axis and during such rotation assuming a position in alignment with said conveyor and said chute to form a bridging extension of said conveyor for the movement of packages from said conveyor of said platform to said chute, latch means movable into and out of latching engagement with said platform, said latch being operable upon latching engagement to hold said platform against rotation with the platform extending in angular relation to the plane of said conveyor and with one of said end rollers positioned above the platform for engagement by the lowermost package on said conveyor and forming a stop for said package, said platform being rotatable about said axis by said lowermost package upon movement of said latch out of latching position, such rotation being effected by the downward advancement of said lowermost package over said platform, the opposite end roller of said platform being movable in stopping position for the package next to said lowermost package.

References Cited in the file of this patent

UNITED STATES PATENTS

| | | |
|---|---|---|
| 376,340 | Palmer | Jan. 10, 1888 |
| 991,148 | Goldman | May 2, 1911 |
| 1,583,093 | Parker | May 4, 1926 |
| 1,749,843 | Roark | Mar. 11, 1930 |
| 1,901,360 | Snow | Mar. 14, 1933 |
| 2,292,821 | Caulkins | Aug. 11, 1942 |
| 2,738,103 | Bisese | Mar. 13, 1956 |

FOREIGN PATENTS

| | | |
|---|---|---|
| 103,883 | Germany | Aug. 10, 1926 |